United States Patent
Peruzzi et al.

(10) Patent No.: US 9,669,611 B2
(45) Date of Patent: Jun. 6, 2017

(54) METHOD AND DEVICE FOR CONNECTING SHEET METAL PARTS TO FORM A LAMINATED CORE

(75) Inventors: Martin Peruzzi, Linz (AT); Ronald Fluch, Linz (AT); Reinhold Stotz, Ansfelden (AT); Bernhard Strauss, Leonding (AT); Franz Dorninger, Katsdorf (AT)

(73) Assignee: Voestalpine Stahl GmbH, Linz (AT)

( * ) Notice: Subject to any disclaimer, the term of this patent is extended or adjusted under 35 U.S.C. 154(b) by 576 days.

(21) Appl. No.: 13/883,365

(22) PCT Filed: Nov. 4, 2011

(86) PCT No.: PCT/EP2011/069437
§ 371 (c)(1),
(2), (4) Date: May 29, 2013

(87) PCT Pub. No.: WO2012/059588
PCT Pub. Date: May 10, 2012

(65) Prior Publication Data
US 2013/0248100 A1    Sep. 26, 2013

(30) Foreign Application Priority Data
Nov. 5, 2010 (EP) .................................... 10014325

(51) Int. Cl.
*B32B 38/00* (2006.01)
*B32B 37/12* (2006.01)
(Continued)

(52) U.S. Cl.
CPC ............ *B32B 38/0004* (2013.01); *B32B 7/12* (2013.01); *B32B 15/043* (2013.01); *B32B 37/12* (2013.01);
(Continued)

(58) Field of Classification Search
CPC ....... B32B 38/004; B32B 7/12; B32B 15/043; B32B 37/12; H02K 15/02
(Continued)

(56) References Cited

U.S. PATENT DOCUMENTS 3,496,119 A    2/1970 Weller et al.
2007/0255189 A1 * 11/2007 Halanski .................. A61F 5/01
                                                              602/8
(Continued)

FOREIGN PATENT DOCUMENTS

DE    24 46 693    4/1976
EP    0 346 512    12/1989
(Continued)

OTHER PUBLICATIONS

International Search Report of PCT/EP2011/069437, Dec. 22, 2011.
International Preliminary Report on Patentability of PCT/EP2011/069437, May 8, 2013.

*Primary Examiner* — Mark A Osele
*Assistant Examiner* — Christopher C Caillouet
(74) *Attorney, Agent, or Firm* — Collard & Roe, P.C.

(57) ABSTRACT

The invention relates to a method for connecting sheet metal parts (4) to form a laminated core (11), wherein sheet metal parts (4) are separated, in particular punched, from a sheet metal strip (2) that has, at least in some areas, a layer having curable polymer adhesive (12), and the sheet metal parts (4) are preliminarily connected to form a laminated core (11), the preliminary connection comprising plasticizing the adhesive (12) at least in some areas and joining the sheet metal parts (4) in order to connect the sheet metal parts by means of the plasticized adhesive (12) of at least one of the sheet metal parts (4), and in a subsequent step the laminated core (11) having preliminarily connected sheet metal parts (4) is subjected to a curing of the adhesive (12). In order to create an advantageous connection between the sheet metal (Continued)

parts, the plasticizing of the adhesive (12) comprises the introduction of a softener (16), in particular $H_2O$.

11 Claims, 3 Drawing Sheets

(51) Int. Cl.
| | |
|---|---|
| *H02K 15/02* | (2006.01) |
| *B32B 7/12* | (2006.01) |
| *B32B 15/04* | (2006.01) |
| *B32B 37/06* | (2006.01) |
| *B32B 37/10* | (2006.01) |
| *B32B 37/18* | (2006.01) |
| *H01F 41/02* | (2006.01) |

(52) U.S. Cl.
CPC ............ *H02K 15/02* (2013.01); *B32B 37/065* (2013.01); *B32B 37/10* (2013.01); *B32B 37/18* (2013.01); *B32B 2310/04* (2013.01); *B32B 2310/0818* (2013.01); *B32B 2311/00* (2013.01); *H01F 41/0233* (2013.01); *Y10T 156/1075* (2015.01); *Y10T 156/13* (2015.01)

(58) Field of Classification Search
USPC .................................... 156/250, 256, 264
See application file for complete search history.

(56) References Cited

U.S. PATENT DOCUMENTS

| | | | |
|---|---|---|---|
| 2009/0068479 | A1 | 3/2009 | Konstanzer et al. |
| 2009/0181247 | A1* | 7/2009 | Lynn ................. H01L 31/02008 |
| | | | 428/339 |
| 2011/0311803 | A1* | 12/2011 | Cockroft ................ C09J 7/0246 |
| | | | 428/323 |

FOREIGN PATENT DOCUMENTS

| | | |
|---|---|---|
| EP | 0 355 778 | 12/1993 |
| EP | 2 011 642 | 1/2009 |
| EP | 2 090 601 | 8/2009 |
| GB | 1 501 676 | 2/1978 |

* cited by examiner

METHOD AND DEVICE FOR CONNECTING SHEET METAL PARTS TO FORM A LAMINATED CORE

CROSS REFERENCE TO RELATED APPLICATIONS

This application is the National Stage of PCT/EP2011/069437 filed on Nov. 4, 2011, which claims priority under 35 U.S.C. 5119 of European Application No. 10014325.4 filed on Nov. 5, 2010, the disclosures of which are incorporated by reference. The international application under PCT article 21(2) was not published in English.

TECHNICAL FIELD

The invention relates to a method for connecting sheet-metal parts to form a laminated core, in which sheet-metal parts are removed, particularly punched, from a sheet-metal strip having a layer that contains curable polymer adhesive, at least in certain regions, and these sheet-metal parts are connected to form a laminated core, which preliminary connection comprises plastification of the adhesive, at least in certain regions, and joining of the sheet-metal parts to connect them by way of the plasticized adhesive of at least one of the sheet-metal parts, and, in a subsequent step, the laminated core having the preliminarily connected sheet-metal parts is subjected to curing of the adhesive.

STATE OF THE ART

In order to facilitate handling of laminated cores coated with curable adhesive resin, it is known from the state of the art (DE2446693A1) to first preliminarily connect the punched parts, before they pass through further handling steps or until their adhesive is finally cured. For the purpose of preliminary connection, the punched-out sheet-metal parts are heated, in order to produce a sufficient adhesive connection using softening or plastification of the adhesive resin. It is true that these sheet-metal parts, which adhere to one another, can now be processed further more easily, but it is disadvantageous that a relatively great amount of process effort is required, because during pre-gluing, precisely the temperature that allows softening of the adhesive resin but does not yet permit curing of the adhesive resin must be adjusted or maintained. If curing takes place during pre-gluing, the final method step of curing can be disrupted to a comparatively great degree as a result, so that reproducible production of laminated cores cannot be guaranteed. Furthermore, during preliminary connection, the heat inertia of the laminated cores must be taken into particular consideration, in order not to enter into a curing cycle for the adhesive even during the cooling phase. The method step of pre-gluing is therefore comparatively susceptible to error and difficult to adjust, so that great stability as well as universal usability for different sheet metals cannot be guaranteed with this method.

Furthermore, methods for the production of laminated cores are known from the state of the art (EP0355778B1), in which such great heating of the laminated cores takes place during the punching process that pre-gluing is not required and caking or curing of the adhesive layer and therefore a firm connection are already achieved during this step. It is true that the risk of undesirable curing can be circumvented with this, but such methods and apparatuses in this regard are comparatively difficult to control and are also complicated in design. For example, it must be avoided that the heated punch already cures the adhesive during the punching process, before the punched-out part is subjected to being connected. Likewise, such high temperatures of the punch can lead to distortion of the sheet-metal part, preventing production of laminated cores with a precise shape. In addition, it is comparatively difficult to influence the parameters for curing or caking of the bonding enamel, and this disadvantageously requires a comparatively long optimization process. Such "one-step" methods furthermore also react sensitively to parameter variations—whether caused by changed sheet-metal parameters, changed sheet-metal part shape, or also by changed enamel parameters—and this can also lead to reduced stability.

Furthermore, a moisture-reactive adhesive composition that requires water for its curing reaction is known from EP2090601A2.

PRESENTATION OF THE INVENTION

The invention has therefore set itself the task, proceeding from the state of the art described initially, of creating a method that can be easily handled, with which sheet-metal parts can be reliably connected to form a laminated core having a precise shape. Furthermore, the method is supposed to be particularly flexible in use and tolerant to parameter changes as well as parameter variations of the sheet metal to be processed.

The invention accomplishes the stated task in that plastification of the adhesive comprises introduction of a plasticizer, particularly of $H_2O$.

If plastification of the adhesive comprises introduction of a plasticizer, then the glass transition temperature or softening temperature of the adhesive can be lowered in this way, in order to thereby allow preliminary connection of the laminated cores with at least reduced temperatures, in contrast to the state of the art (DE2446693A1). In this way, it can particularly be avoided that the adhesive already cures or partially cures during preliminary connection, so that the subsequent method steps, particularly the method step of curing for final connection of the sheet-metal parts, are not impaired. In contrast to the state of the art, a reproducible method can therefore be guaranteed. In addition, distortion of the sheet-metal parts during preliminary connection can be excluded by means of reduced temperature stresses, so that the method can meet the requirements of great precision and thereby can allow laminated cores that are precise in shape. Furthermore, temperature adjustments during preliminary connection that are difficult to adjust or estimate can be avoided by means of the reduced glass transition temperature according to the invention, so that a method that is simple to handle is available, which method can also be particularly tolerant with regard to parameter changes and parameter variations of the sheet metal to be processed. Even different sheet-metal thicknesses as well as changes in dimensions of the sheet-metal parts can be reduced in terms of their influence on the connection behavior during preliminary connection. The method can therefore be characterized not only by secure preliminary connection and secure final curing, in terms of its stability, but is advantageously particularly versatile and therefore flexible, and can be universally used.

In particular, $H_2O$ has excelled as a plasticizer for simplifying the method, because this plasticizer can be driven out of the laminated core or adhesive in simple manner during final curing, so that the method settings for curing can be undertaken with known parameters. However, it does not need to be further mentioned at this point that $H_2O$ is comparatively simple to handle as a method agent, and that this can lead to a particularly cost-advantageous method in combination with improved energy efficiency due to reduced method temperatures. However, other plasticizers are certainly possible, for example compounds having low molecular weight, particularly phthalic acid esters (dibutyl phthalate DBP; dioctyl phthalate DOP), and/or alcohol.

In general, thermoplastic and/or duroplastic materials have excelled as a polymer adhesive, whereby thermoplastic and/or duroplastic bonding enamels have proven themselves as an adhesive in connecting sheet-metal parts, in order to thereby produce electromagnetic components, for example rotor and stator blades of electrical machines, dynamo blades, electrical sheet metal, throttle or transformer blades. Bonding enamels on the basis of polyvinyl butyral, polyamides or epoxy resin are further possibilities, in general. Furthermore, the invention includes that at least in certain regions, a layer of curable polymer adhesive is present, and that this layer of curable polymer adhesive exists to allow pre-gluing with another sheet-metal part by means of this adhesive. Preferably, the layer of curable polymer adhesive is provided on the outside of the sheet metal, in order to allow secure pre-gluing.

If the glass transition temperature of the adhesive of the sheet metal is lowered to less than or equal to the temperature of the sheet-metal part during joining by means of the introduction of plasticizers, then the method step of preliminary connection can be structured to be particularly robust. This is because temperature differences of the sheet-metal parts to be preliminarily connected cannot lead to impairment of the plastification process, because the glass transition temperature is lowered in such a manner that no undesirable solidification of the plasticized adhesive can come about any longer. A possible temperature difference between sheet-metal part and adhesive therefore cannot lead to a disruption of the adhesive connection, and therefore a stable method for pre-gluing can be brought about. Furthermore, the temperature of the sheet-metal part can be utilized for plastification of the adhesive or can contribute to doing without additional method steps for heating the adhesive or the sheet metal or sheet-metal strip and/or sheet-metal part. Furthermore, it does not need to be mentioned further that by doing without complicated and error-prone temperature monitoring or control, clear simplification of the method can be made possible.

In order to avoid complicated handling of the sheet-metal parts for the step of introduction of plasticizers into the adhesive, the plasticizer is introduced into the adhesive already before removal of the sheet-metal part from the sheet-metal strip. It can therefore be avoided that comparatively complicated guides and holders for the removed sheet-metal parts must be provided. In this way, not only can simplified method conditions be created, but also, it can be ensured that sufficient plasticizer can be applied to the adhesive of the sheet-metal part. Likewise, irregularities in the distribution of the introduction of plasticizer can be more easily excluded, and this can lead to a particularly reproducible method.

If the plasticizer is introduced into the adhesive by way of an aerosol that contains this plasticizer, then uniform introduction can be made possible. A risk of the formation of islands without plasticizer in the adhesive can furthermore be kept small, and this can lead to a particularly reproducible and robust method. In particular, water vapor with $H_2O$ as the plasticizer has proven to be comparatively easy to handle, in order to thereby arrive at secure pre-gluing.

If the sheet-metal parts are joined under pressure during preliminary connection, then in this way, sufficient and secure physical preliminary connection of the sheet-metal parts can be ensured in simple manner. In addition, uniform distribution of the plasticized adhesive between the sheet-metal parts to be connected can also be adjusted by way of this physical gluing, and this can be utilized for laminated cores having a precise shape and for great connection strength.

Particularly great precision and strength of the laminated core can be guaranteed if, during curing, the adhesive in the region of the edge zone of the laminated core is cured first, under pressure. Such curing under pressure, for example using a heating press, can specifically ensure that despite possible edge deformations, firm gluing of the sheet-metal parts takes place, before the remaining adhesive of the laminated core is cured. Therefore a laminated core having a stable shape is already available for final curing, so that this curing can be carried out without any risk of a change in shape, and therefore even comparatively long curing times can be undergone.

If the remaining adhesive is cured in pressure-free manner, using the inherent heat of the laminated core, then stress-free and at least partially chemical curing of the adhesive can be utilized to increase the strength of the laminated core even more. Furthermore, in this way damage to the surface of the laminated core can be avoided, and this can particularly ensure a uniform surface or defect-free insulation and therefore can also avoid changes in the electromagnetic properties of the laminated core. In addition, curing with inherent heat offers the advantage of undertaking this curing during cooling of the laminated core at room temperature, so that no further special measures for method management have to be provided. A method that can be carried out relatively simply, for connection of sheet-metal parts to form a laminated core, can be created in this way.

Special temperature management of the laminated core for comparatively great strength can be created if the laminated core is heated inductively during curing.

The invention has furthermore set itself the task, proceeding from the state of the art described initially, of creating a simple and stable apparatus for connecting sheet-metal parts to form a laminated core.

The invention accomplishes the stated task in that the plastification device has a plasticizer unit for introduction of a plasticizer, particularly of $H_2O$, into the adhesive.

If the plastification device has a plasticizer unit for introduction of a plasticizer into the adhesive, then it is possible to do without complex control measures or design structures in the region of the preliminary connection of the sheet-metal parts to form a laminated core. Furthermore, the introduction of $H_2O$ as a plasticizer can be accomplished in comparatively simple manner, in terms of design, and reliably in terms of the method, so that aside from a cost-advantageous apparatus, particularly great stability can also be achieved. The plasticizer unit only has to be structured in such a manner that the plasticizer can be applied to the adhesive. For this purpose, nozzles directed at the adhesive or also a bath through which the adhesive is passed are/is possible.

A simple design can particularly be achieved if the plasticizer unit has at least one nozzle directed at the adhesive, through which the plasticizer flows. In this way, water vapor can be directed onto the adhesive precisely, and this can ensure particular plastification of the adhesive.

A compact apparatus can be created if the plasticizer unit is disposed between two blades of the cutting device. Furthermore, the introduction of plasticizer can be undertaken directly ahead of the next processing step, in order to avoid undesirable evaporation of the plasticizer.

If the cutting device has a punching tool that is mounted in displaceable manner, in order to put pressure on the sheet-metal parts during their preliminary connection, in the direction of the sheet-metal parts on the stacking device, then the cutting device can also be used to press down on the laminated core. In this way, a simple design of the apparatus can be created.

The curing device has at least one press having an induction coil for curing the edge region of the laminated core under pressure, in order to thereby bring about early curing of this region. In this way, the laminated core can be prepared for further curing steps in particularly robust and stable manner.

The regions of the laminated core that lie on the inside can thereby be subjected to their own cycle of curing, if the curing device has a storage location for pressure-free curing of the remaining adhesive, using the inherent heat of the laminated core. In this way, not only can the adhesive be cured without damage on the surface of the laminated core, but also, particularly advantageous curing can be made possible in the interior of the laminated core, in order to achieve great strength.

The invention can therefore be particularly characterized in that a plasticizer, particularly $H_2O$, is used to lower the glass transition temperature of a curable polymer adhesive provided on a sheet-metal part, during connection with another sheet-metal part, to form a laminated core. In particular, bonding enamel has excelled as an adhesive for this purpose.

WAY OF IMPLEMENTATION OF THE INVENTION

Figure 1:
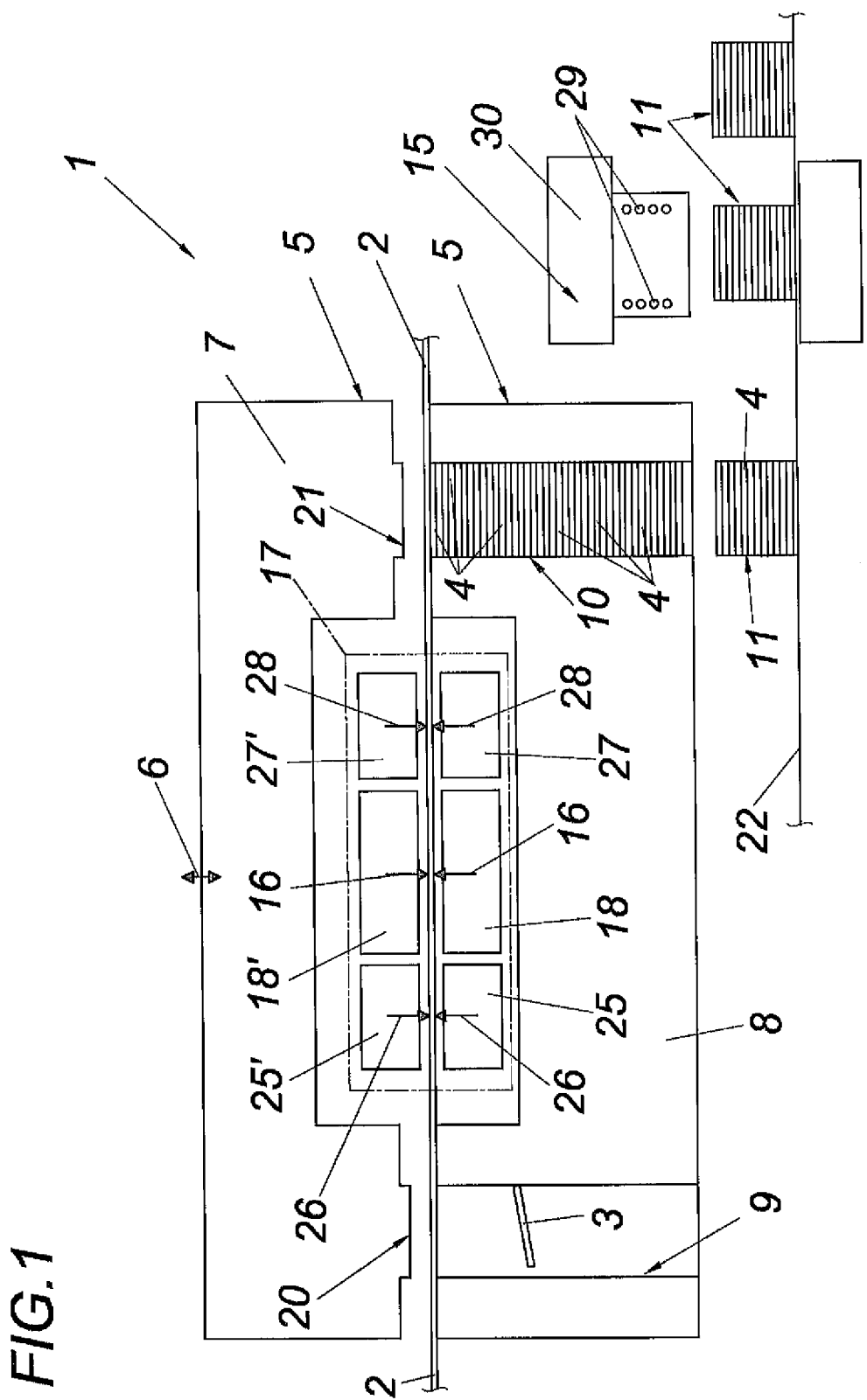
FIG. 1 a side elevation of an apparatus for connecting sheet-metal parts to form a laminated core, FIG. 2 an enlarged view of the plastification device, FIG. 3 an enlarged partial view of joining of the laminated cores, FIG. 4 a top view of the laminated core, shown partially in elevation, during curing of its edge zone, and FIG. 5 a side view of the laminated core curing final curing.
Figure 2:
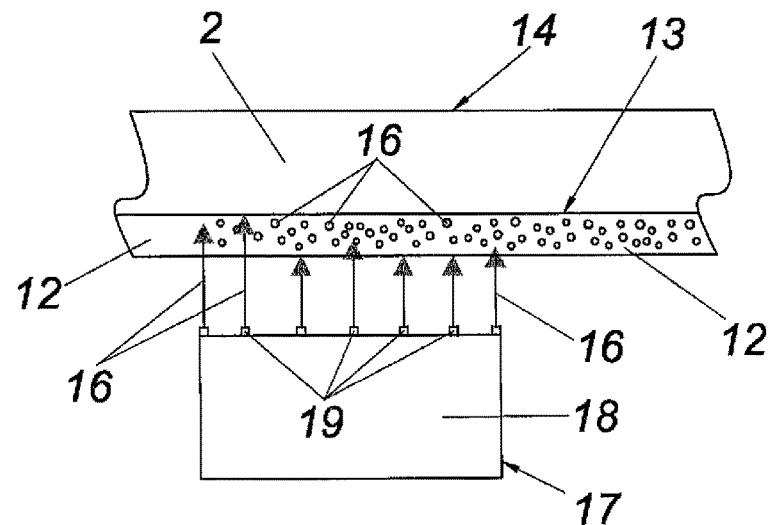

The apparatus 1 shown as an example in FIG. 1 shows a sheet-metal strip 2 from which sheet-metal parts 3 and 4 are removed. For this purpose, a cutting device 5 is provided, which can punch sheet-metal parts 3 and 4 out of the sheet-metal strip 2 by means of up and down movements 6 of its cutting tool 7 in interaction with its lower tool 8. These sheet-metal parts 3 and 4 are forced into a shaft 9 and 10, respectively, by means of the punching process, where they can be moved away from the sheet-metal strip 2. Likewise, removing a sheet-metal part 4 with a laser is possible, but this is not shown in further detail. The sheet-metal parts 4 accommodated in the shaft 10 are subsequently preliminarily connected to form a laminated core 11, so that they are available to the next method steps as a processing unit, in easy to handle manner. For this purpose, the adhesive 12, which is preferably applied to the two longitudinal sides 13 and 14 of the sheet-metal strip 2, preferably over the full area, is plasticized, so that when the sheet-metal parts 4 are joined together, physical gluing between these sheet-metal parts 4 can be made possible. This can particularly be seen in FIG. 2. The laminated core 11, pre-glued and leaving the shaft 10, can subsequently—as known—be subjected to curing using a curing device 15, for example comprising an oven, press, or heating press, and a storage location. For this purpose, the laminated cores 11 exiting from the shaft 10 are provided on a conveying device 22. In order to now prevent the adhesive layer 12 from already passing through a curing cycle during pre-gluing, it is proposed, according to the invention, that plastification of the adhesive 12 comprises introduction of a plasticizer 16, as can particularly be seen in FIG. 2. The plasticizer 16 now penetrates into the adhesive 12. For the sake of comprehensibility, the plasticizer 16 has been shown delimited in circular shape in the adhesive 12. However, this does not preclude that the plasticizer 16 dissolves in the adhesive 12, and any other type of connection is also possible. For introduction of the plasticizer 16 into the adhesive 12, the apparatus 1 has a plastification device 17 having a plasticizer unit 18. The adhesive layer 12 of the sheet-metal strip 2 is now impacted with plasticizer 16 by way of the plasticizer unit 18; for example, nozzles 19 are provided for this purpose, which spray plasticizer 16—directed at the longitudinal side 13 of the sheet-metal strip 2—onto the adhesive 12 that is passing by, specifically over its width on the sheet-metal strip 2. A simple implementation of the plasticizer 16 can be $H_2O$, which can be applied to the adhesive 12 as water vapor, for example. It is also possible here to introduce the adhesive 12 into a water bath, which is not shown in any detail here. The water now penetrates into the adhesive 12, thereby causing the adhesive 12 to partially lose its internal strength, to soften, and thereby its glass transition temperature can also be lowered. Such preliminary connection is still possible, however, even if only a superficial introduction of plasticizer 16 into the adhesive 12 takes place, because sufficient plastification can be ensured in this way, as well.

It is advantageous if plasticizer 16 is introduced in such a manner that the glass transition temperature of the adhesive 12 is lowered to less than or equal to the temperature of the sheet-metal part 4 during joining. In this way, not only can the risk of curing of the adhesive 12 during preliminary connection be further reduced, but also, the temperature increase of the sheet-metal part 4 as the result of removal, for example punching out, from the sheet-metal strip 2 can be utilized to plasticize the adhesive 12 for its physical connection, without any additional design measures.

This lowering of the glass transition temperature is undertaken before removal or punching out of the sheet-metal parts 4, in order to allow not only a simple design but also an increased method speed. For this purpose, the plastification device 17 is provided between the two blades 20 and 21 of the cutting tool 7, as can particularly be seen in FIG. 1. Now, the sheet-metal strip 2 can be prepared in a punching step, by means of the two blades 20 and 21, on the one hand, in that sheet-metal parts 3 not required for the sheet-metal part 4 are removed from the sheet-metal strip 2, and on the other hand, those sheet-metal parts 4 of which the laminated core 11 is composed can be created. A simple design solution and a fast method can be created in this way.

Figure 3:
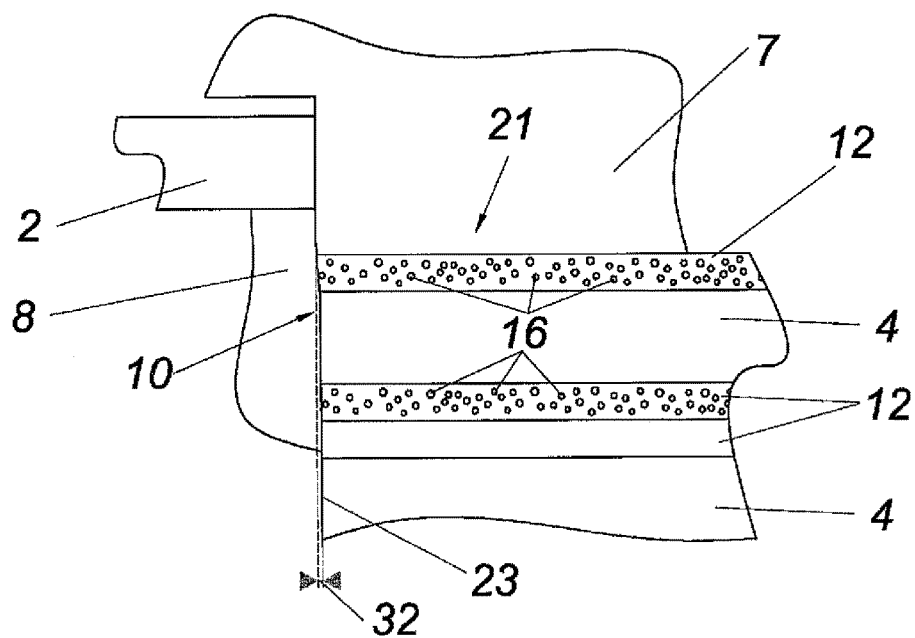

The cutting tool 7 introduces the sheet-metal parts 4 into a shaft 10 that has a reduced dimension 32 relative to the sheet-metal parts 4, at least in part, as can be seen in FIG. 3. In this way, a pressure stress can be exerted on the sheet-metal parts 4 that are stacking up in the shaft 10, by way of the cutting tool 7, which stress can be utilized for physical preliminary connection of the sheet-metal parts 4. The shaft 10 therefore acts in the manner of a braking stacking device 23. In particular, physical gluing can be ensured by way of the friction resistance of the sheet-metal parts 4 in the shaft 10 or by way of the pressing action of the sheet-metal parts 4 caused by this resistance. In this connection, it is unimportant whether adhesive 12 has been applied on both sides of the sheet-metal strip 2 or of the sheet-metal parts 4, or also whether this has been plasticized. At least one adhesive 12 must demonstrate plastification, by way of which pre-gluing to the adjacent sheet-metal part 4 is possible. Thus it is shown in FIG. 3, as an example, that even non-plasticized adhesive 12 can enter into an adhesive connection with a plasticized adhesive 12.

Preferably, however, the adhesives 12 on both sides of the sheet-metal strip 2 are plasticized, thereby making it possible to create a particularly stable preliminary connection, particularly because homogenization can be utilized by means of mixing of the adhesives 12, in order to be able to equalize possible method variations or tolerances during plastification.

The curing device 15 has a press 30, preferably a heating press, for at least partial curing of the laminated core 11 under pressure. The laminated core 11 can be introduced into this press 30 and be cured exclusively with a combination of temperature and time, without having to provide other means for holding the laminated core 11 together, particularly since the laminated cores 11 demonstrate shape stability for this, even in preliminarily connected form. Imprecise formations in shape caused by such aids for holding them together can be avoided in simple manner as a result.

Figure 4:
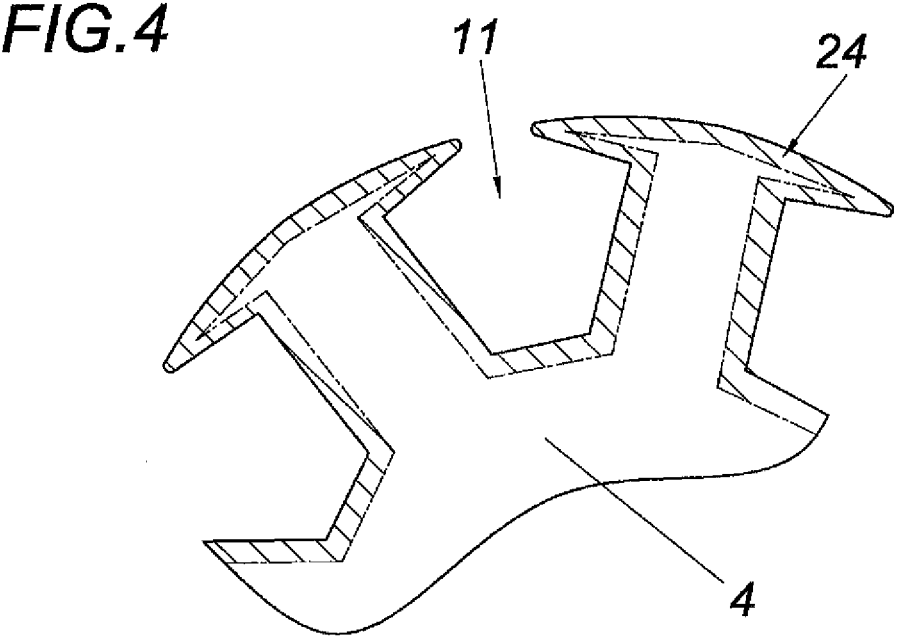

Furthermore, an arrangement of an induction coil 29 in the press 30 can also be seen in FIG. 1; the edge region 24 of the laminated coil 11 introduced into the press is heated to a greater degree by this coil, and therefore can be subjected to early curing, before the remaining adhesive 12 cures or is cured. Such edge-side curing is shown according to FIG. 4, for example, whereby the boundary of the edge region 24 can also run at an irregular distance relative to the edge of the laminated core 11. Such chemically cross-linked edge regions 24 can thereby ensure clearly improved strength of the finished laminated core 11, which is structured here, for example, as a laminated core for a rotor of an electrical machine. In this connection, inductive heating of the laminated core 11 has proven to be particularly advantageous, because in this way, individual geometrical strength requirements of the laminated core 11 can be taken into consideration.

Figure 5:
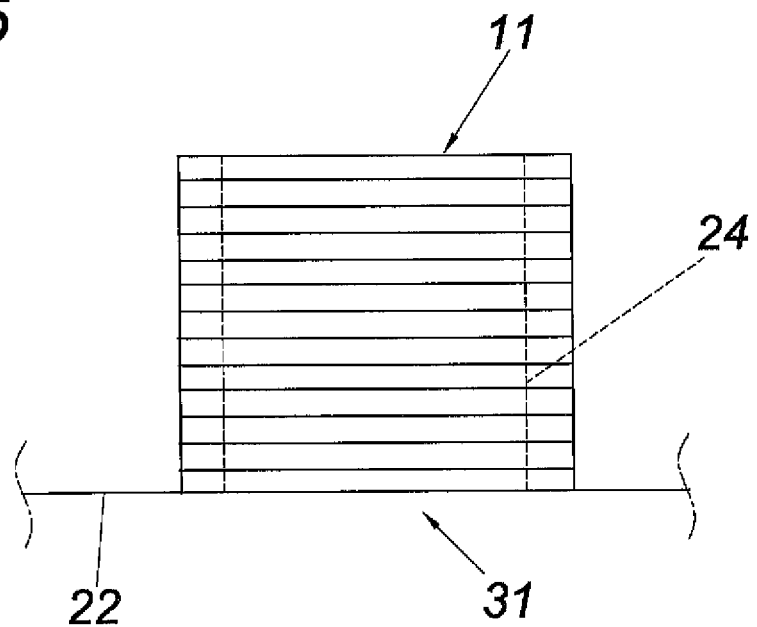

This strength can be further increased in that the curing device 15 according to FIG. 5 has a storage location 31 for pressure-free curing of the remaining adhesive 12 using the inherent heat of the laminated core 11. Such curing takes place at room temperature, for the sake of simplicity. Experiments have shown excellent ability of the laminated core 11 pre-baked in this way, on the basis of this pressure-free final curing. It was possible to demonstrate almost an elevated stress limit in tear strength as compared with conventionally produced laminated cores.

It does not need to be further pointed out that instead of a press, other means are also possible for initializing of curing of the edge region of the laminated core. Infrared radiators, UV radiators, means for high-frequency heating, a chemical evaporator, are examples of such means.

Depending on whether an adhesive 12 is to be plasticized on both sides of the sheet-metal strip 2 or of the sheet-metal parts 4, the plastification device 17 has two plasticizer units 18 and 18', which plasticize the adhesive layer 12, in each instance, in parallel, for example, with water vapor as the plasticizer 16. Furthermore, the plastification device 17 can have a pre-heating unit 25, disposed ahead of the plasticizer unit 18, to carry out additional heating of the adhesive 12, if necessary. This can be particularly useful if the glass transition temperature of the adhesive 12 cannot be sufficiently lowered by means of the introduction of the plasticizer 16, for pre-gluing, which is possible, for example, by means of a required increased process speed. A pre-heating unit 25 and 25' can now be disposed, once again, on both longitudinal sides 13 and 14 of the sheet-metal strip 2, whereby heating of the adhesive 12 can also take place by means of hot air 26, for example. Supplementally and alternatively, it is possible to heat the plasticizer 16 or also the water vapor, in order to thereby achieve the same effect. Furthermore, a coating unit 27 is assigned to the plastification unit 17, with which a parting agent 28 can be applied to the sheet-metal strip 2, if necessary, in order to prevent the laminated cores 11 from sticking together in the shaft 10 or to be able to separate the laminated cores 11 from one another more easily. This coating unit 27 can be provided on both sides of the laminated core, as shown in FIG. 1 using the coating units 27 and 27'.

The invention claimed is:

1. Method for connecting sheet-metal parts (4) to form a laminated core (11), comprising removing sheet-metal parts (4) from a sheet-metal strip (2) having a layer that contains a thermally curable polymer adhesive (12), at least in certain regions, and these sheet-metal parts (4) are connected to form a laminated core (11), which preliminary connection comprises plastification of the adhesive (12), at least in certain regions, and joining of the sheet-metal parts (4) to connect them by way of the plasticized adhesive (12) of at least one of the sheet-metal parts (4), and, in a subsequent step, the laminated core (11) having the preliminarily connected sheet-metal parts (4) is subjected to curing of the adhesive (12), wherein plastification of the adhesive (12) comprises introduction of a plasticizer (16);

wherein the glass transition temperature of the adhesive (12) is lowered, by means of the introduction of plasticizer (16).

2. Method according to claim 1, wherein the plasticizer (16) is introduced into the adhesive (12) before removal of the sheet-metal part (4) from the sheet-metal strip (2).

3. Method according to claim 1, wherein the plasticizer (16) is introduced into the adhesive (12) by way of an aerosol that contains plasticizer (16).

4. Method according to claim 3,
wherein the plasticizer (16) is introduced into the adhesive (12) by the way of an aerosol that contains plasticizer (16) comprising water vapor.

5. Method according to claim 1, wherein the sheet-metal parts (4) are joined together under pressure during the preliminary connection process.

6. Method according to claim 1, wherein during curing, first, the adhesive (12) in a region of an edge zone (24) of the laminated core (11) is cured under pressure, and then the remaining adhesive (12) of the laminated core (11) is cured.

7. Method according to claim 6, wherein the remaining adhesive (12) is cured without pressure, using inherent heat of the laminated core (11).

8. Method according to claim 6, wherein the laminated core (11) is inductively heated during curing.

9. Method according to claim 1,
wherein the sheet metal parts are removed by being punched.

10. Method according to claim 1,
wherein the plasticizer (16) is water.

11. Method according to claim 1,
wherein the glass transition temperature of the adhesive (12) is lowered to a temperature less than or equal to the temperature of the sheet-metal part (4) during joining.

\* \* \* \* \*